(12) United States Patent
Nagamizu et al.

(10) Patent No.: US 8,192,259 B2
(45) Date of Patent: Jun. 5, 2012

(54) VENTILATION SYSTEM OF SLUDGE RECEIVING FACILITY

(75) Inventors: Koji Nagamizu, Tokyo (JP); Akihisa Koga, Tokyo (JP); Akinori Kimura, Tokyo (JP); Hiroyuki Kosumi, Tokyo (JP); Hiroyuki Terunuma, Tokyo (JP); Akihiro Ogata, Tokyo (JP); Yusuke Nakai, Tokyo (JP); Koyuru Horiike, Tokyo (JP); Yoshihiro Ishibashi, Tokyo (JP); Nobuyuki Otani, Tokyo (JP); Takahiro Shikazaki, Tokyo (JP); Naoki Deguchi, Tokyo (JP); Hideomi Yoshida, Tokyo (JP); Masafumi Itoh, Tokyo (JP)

(73) Assignee: Mitsubishi Materials Corporation, Tokyo (JP)

( * ) Notice: Subject to any disclaimer, the term of this patent is extended or adjusted under 35 U.S.C. 154(b) by 637 days.

(21) Appl. No.: 12/320,198

(22) Filed: Jan. 21, 2009

(65) Prior Publication Data

US 2009/0188847 A1    Jul. 30, 2009

Related U.S. Application Data

(63) Continuation of application No. 11/990,979, filed as application No. PCT/JP2005/015533 on Aug. 26, 2005, now abandoned.

(51) Int. Cl.
*F24F 11/00* (2006.01)
*B01D 35/00* (2006.01)
*B01B 35/00* (2006.01)

(52) U.S. Cl. ..................... 454/229; 210/120

(58) Field of Classification Search .......... 454/229, 454/327, 252, 253, 256; 210/120
See application file for complete search history.

(56) References Cited

U.S. PATENT DOCUMENTS 5,568,996 A * 10/1996 Buehler .................... 405/129.55

FOREIGN PATENT DOCUMENTS

| JP | 11-188390 | 7/1999 |
|---|---|---|
| JP | 3246509 | 11/2001 |
| JP | 2002-254095 | 9/2002 |
| JP | 2002254095 A * | 9/2002 |
| JP | 2005-125253 | 5/2005 |
| JP | 2005125253 A * | 5/2005 |

OTHER PUBLICATIONS

David Rimington and Gavin Brown, Ventilation and the control of odours in the sewage treatment industry, Feb. 1987, ASP group, BIGGLESWADE, Sewage treatment and odour control/fitting, pp. 64-66.*
International Search Report issued Oct. 25, 2005 in International Application No. PCT/JP2005/015533.

* cited by examiner

*Primary Examiner* — Steven B McAllister
*Assistant Examiner* — Helena Kosanovic
(74) *Attorney, Agent, or Firm* — Wenderoth, Lind & Ponack, L.L.P.

(57) ABSTRACT

A sludge receiving facility is provided with upper and lower structures respectively having inner spaces communicating with each other, wherein sludge tanks each having a sludge charging port are provided in the lower structure, and a partition wall configured to partition a carrying-in space of the upper structure from the inner space is provided, the sludge receiving facility including: outside air blowing means; air circulating means configured to enable the inner space and the carrying-in space to communicate with each other; first exhausting means configured to exhaust air from an upper part of the carrying-in space; second exhausting means configured to exhaust air above the sludge charging port; and third exhausting means configured to exhaust air inside the sludge tanks, wherein opening/closing means are respectively provided in the circulating means and the first to third exhausting means.

8 Claims, 5 Drawing Sheets

US 8,192,259 B2

VENTILATION SYSTEM OF SLUDGE RECEIVING FACILITY

This application is a continuation of application Ser. No. 11,990,979, now abandoned which is the National Stage of International Application No. PCT/JP2005/015533, filed Aug. 26, 2005

TECHNICAL FIELD

The present invention relates to a ventilation system in a sludge receiving facility for temporarily storing sludge, such as sewage sludge.

BACKGROUND ART

As for the disposal of wet sludge, such as sewage sludge, discharged from a sewage disposal plant, the conventional reclamation disposal and ocean disposal have become difficult because of the depletion of disposal site and the restrictions for preventing environmental pollution in recent years. For this reason, there has been also proposed a method for incinerating the wet sludge in an incinerator. However, for example, even the sewage sludge which is formed into a dehydrated cake in the sewage disposal plant contains about 80% moisture.

Therefore, in the disposal method using the incinerator, it is necessary to dry the wet sludge beforehand in order to reduce the thermal load of the incinerator. This results in a problem that the disposal method is inferior in cost effectiveness because additional costs, such as the cost for drying the wet sludge, and the cost for deodorizing the exhaust gas generated during the drying treatment are required in addition to the cost originally required for the incineration.

Thus, in order to solve the above described problem, the present applicants have previously proposed, in Japanese Patent No. 3246509 (Patent Document 1), a wet sludge disposal facility utilizing a cement clinker manufacturing facility.

The patented invention is, as shown in FIG. 5, a wet sludge disposal facility installed in combination with a cement clinker manufacturing facility which includes a preheater 1 for preheating a cement raw material crushed by a raw-material mill, and a dry process kiln 3 connected to the preheater 1 at the kiln inlet part 2 of the dry process kiln 3, for calcining the preheated cement raw material. The wet sludge disposal facility is characterized by including: a sludge tank 4 for storing wet sludge; a pressure feed pump 5 for pressure-feeding the wet sludge in the sludge tank 4; and a pipe 6 connected to the pressure feed pump 5, for directly charging the wet sludge into the dry process kiln 3, and is characterized in that the pipe 6 is connected to the kiln inlet part 2 or a calcining furnace 7.

According to the above described wet sludge disposal facility, wet sludge, such as sewage sludge, is directly charged into the existing dry process kiln 3 and incinerated in a high temperature atmosphere of 800° C. to 1200° C., without applying pretreatment such as drying treatment and additive adding treatment, and without causing a problem of environmental pollution, whereby the final treatment of the wet sludge can be efficiently performed at low cost, and the sludge incineration ash can be economically reused as cement clinker. Further, since the wet sludge is pressure-fed through the pipe 6 so as to be directly incinerated, it is also possible to obtain an effect of preventing the malodor problem and the like.

Meanwhile, for example, when sewage sludge is disposed in the above described disposal facility, the excess moisture of the sewage sludge is usually removed so as to be formed into a dehydrated cake having a moisture content of around 80% in the sewage disposal plant mainly for convenience of transportation, and is then transported to the cement manufacturing plant by a truck.

In the upper part of the sludge tank 4, a large sludge charging port is formed to receive the wet sludge transported by the truck. In the sludge charging port, there is provided a closing cover which is closed except at the time of receiving the sludge transported by the truck, because when the sludge charging port is always opened, malodor and gas may be generated from the surface of the wet sludge in the sludge tank 4, and diffused to the outside so as to deteriorate the working environment. Further, the sludge tank 4 is covered by a building 8, and apparatuses, such as a put-out apparatus of the sludge tank 4, the pressure feed pump 5, and a hydraulic unit 9 for driving the pressure feed pump 5 are installed in the building 8.

However, when the sludge tank 4 is simply covered only by the building 8 or the like, the malodor and gas stagnate in the inner space of the building 8. For this reason, there is a problem that when the gate of the building 8 is opened, for example, in order to allow the truck to enter the building 8, the malodor and gas are discharged to the outside. Further, there is also a problem that when a worker enters the building 8 in order to perform maintenance of the above described apparatuses, the worker is exposed to a poor working environment due to the malodor and the like.

Further, since the sludge tank 4 is always closed by the closing cover, the highly concentrated malodor and the like stagnates in the sludge tank 4. For this reason, there is a problem that when the closing cover is opened at the time of receiving the sludge or at the time of repairing the sludge tank 4, the malodor in the sludge tank 4 is dispersed inside the building 8, to thereby cause a similar harmful effect.

Thus, it is necessary to provide a ventilation system for ventilating the inside of the building 8. However, there is a problem that in order to always perform overall ventilation inside the building 8 and the sludge tank 4 in an air quantity also enabling the discharge of the malodor and the like generated in a large quantity at the time of sludge reception, an outer air blowing fan and an exhaust suction fan, each having an extremely large capacity, are required to thereby cause an increase in the facility costs and operation costs.

Further, depending upon the properties of the sewage sludge and the temperature atmosphere inside the building 8, harmful gases such as methane gas and hydrogen sulfide gas may be generated from the sludge tank 4. Further, the methane gas having a specific gravity smaller than that of air stagnates in the upper part of the building 8, while the hydrogen sulfide gas having a specific gravity larger than that of air stagnates in the lower part of the building 8. For this reason, there is a problem that in order to prevent the stagnation of the gases, a ventilating flow from the lower part to the upper part of the building 8 needs to be always formed by the above described fans having a further larger capacity.

Patent Document 1: Japanese Patent No. 3246509

SUMMARY OF THE INVENTION

The present invention has been made in view of the above described circumstances. An object of the invention is to provide a ventilation system of a sludge receiving facility, in which during ordinary operation, at the time of receiving sludge, and the like, ventilation of a malodor generating place is selectively and preferentially performed, whereby a gas having malodor or the like can be efficiently prevented from stagnating inside a sludge tank and a structure covering the sludge tank by ventilating means of small capacity.

In order to solve the above described problems, according to a first aspect of the present invention, there is provided a ventilation system of a sludge receiving facility, in which an upper structure and a lower structure, respectively having inner spaces communicating with each other with a running surface of transportation means as a boundary, are constructed, in which a gate having opening/closing means is provided in a wall of the upper structure facing the running surface, in which a sludge tank having a sludge charging port configured to be opened on the running surface and configured to be provided with closing means in an openable and closable manner is provided in the lower structure, and in which a partition wall configured to partition a carrying-in space ranging from the gate to the sludge charging port from the inner space is provided in the upper structure, the ventilation system of the sludge receiving facility being characterized by including: outside air blowing means configured to continuously and forcibly feed outside air to the inner space from the bottom part of the lower structure; air circulating means configured to enable the inner space and the carrying-in space to communicate with each other; first exhausting means configured to exhaust air in the carrying-in space from an upper part of the carrying-in space; second exhausting means provided in a position facing the sludge charging port of the carrying-in space, and configured to exhaust air above the sludge charging port; and third exhausting means configured to exhaust air in the sludge tank, and characterized in that opening/closing means is provided in each of the circulating means, the first exhausting means, the second exhausting means, and the third exhausting means.

Further, a second aspect of the present invention is characterized, in the first aspect of the present invention, in that there are provided, in an upper part of the inner space, a methane gas detector, and methane gas discharge control means configured, when a detection value of the detector reaches a set value, to open the opening/closing means of the circulating means and the first exhausting means at the time when the opening/closing means are not opened, and to close the opening/closing means of the third exhausting means at the time when the opening/closing means is not closed.

Further, a third aspect of the present invention is characterized, in one of the first and second aspects of the present invention, in that there is provided, in the lower structure, fourth exhausting means configured to exhaust air in the inner space and provided with opening/closing means, and in that there are provided, in a lower part of the lower structure, a hydrogen sulfide gas detector and hydrogen sulfide gas discharge control means configured, when a detection value of the detector reaches a predetermined value, to open the opening/closing means of the fourth exhausting means at the time when the opening/closing means is not opened, and to close the opening/closing means of the first to third exhausting means when the opening/closing means are not closed.

Further, a fourth aspect of the present invention is characterized, in one of the first to third aspects of the present invention, in that there is provided fifth exhausting means configured to always exhaust air in the sludge tank at a flow rate lower than that of the third exhausting means.

In one of the first to fourth aspects of the present invention, during ordinary operation, the outside air is continuously and forcibly fed from the bottom part of the lower structure to the inner space by the outside air blowing means, while the opening/closing means of the circulating means for enabling the inner space and the carrying-in space to communicate with each other and the opening/closing means of the first exhausting means are held opened. Then, the outside air fed to the inside of the lower structure is made to flow from the inner space into the carrying-in space via the circulating means, so as to be exhausted to the outside from the upper part of the carrying-in space by the first exhausting means. As a result, the air in the carrying-in space, in which malodor and the like is in particular likely to be generated, is prevented from flowing into the inner space, whereby it is possible to surely prevent the malodor and the like which is leaked from the sludge tank, from stagnating in the upper structure and the lower structure of the sludge receiving facility.

Further, at the time of receiving sludge, in the state where the opening/closing means of the third exhausting means is opened to exhaust the air in the sludge tank, the opening/closing means of the circulating means is closed, and further the opening/closing means of the first and second exhausting means are opened, thereby exhausting the air in the carrying-in space, in which the sludge is charged into the sludge tank with its sludge charging port opened, and the air above the sludge charging port. In this way, the air in the sludge tank and the carrying-in space, in which malodor is generated in a large quantity by the charging of the sludge, is preferentially exhausted, whereby it is possible to prevent the malodor from flowing backward to the inner space, or from being dispersed to the outside from the gate opened to allow the entry of the carrying-in means.

Further, in the second aspect of the present invention, when methane gas is generated from the sludge in the sludge tank, and stagnates in the inner space in which apparatuses are installed and which serves as a working space, the concentration of the methane gas in the upper part of the inner space is increased. Then, when a value detected by the methane gas detector provided in the upper part of the inner space reaches a set value regarded as harmful, the opened state of the opening/closing means of the circulating means and the first exhausting means is secured by the methane gas discharge control means, and the closed state of the opening/closing means of the third exhausting means for exhausting the air in the sludge tank is secured by the methane gas discharge control means. As a result, the outside air fed in the lower structure is made to flow together with the methane gas in the inner space, from the circulating means to the inside of the carrying-in space, and is exhausted to the outside from the upper part of the inner space by the first exhausting means.

Further, in the third aspect of the present invention, when hydrogen sulfide gas is similarly generated and stagnates in the inner space, the hydrogen sulfide gas stagnates in the bottom part of the inner space, where the concentration of the hydrogen sulfide gas is increased. Then, when a value detected by the hydrogen sulfide gas detector provided in the lower part of the inner space reaches a set value regarded as harmful, the opened state of the opening/closing means of the fourth exhausting means for exhausting the air in the inner space of the lower structure is secured by the hydrogen sulfide gas discharge control means, and the closed state of the opening/closing means of the first to third exhausting means is secured by the hydrogen sulfide gas discharge control means. As a result, the outside air fed in the lower structure is early exhausted together with the hydrogen sulfide gas, to the outside mainly by the fourth exhausting means.

In this way, according to one of the first to fourth aspects of the present invention, during ordinary operation, at the time of sludge reception, and the like, ventilation of places where malodor is generated and where harmful gas stagnates is selectively and preferentially performed, while the exhausting of air in other places is stopped. Thereby, malodor gas and the like can be efficiently prevented from stagnating in the sludge tank and the structure covering the sludge tank by the ventilating means of smaller capacity.

Further, according to the fourth aspect of the present invention, even when the opening/closing means of the third exhausting means is closed except at the time of sludge reception, it is possible to always ventilate the air in the sludge tank by the fifth exhausting means which is provided in the sludge tank and has a small-diameter. Thereby, the malodor concentration in the sludge tank can be prevented from being increased by a small amount of energy.

DESCRIPTION OF SYMBOLS

Figure 1:
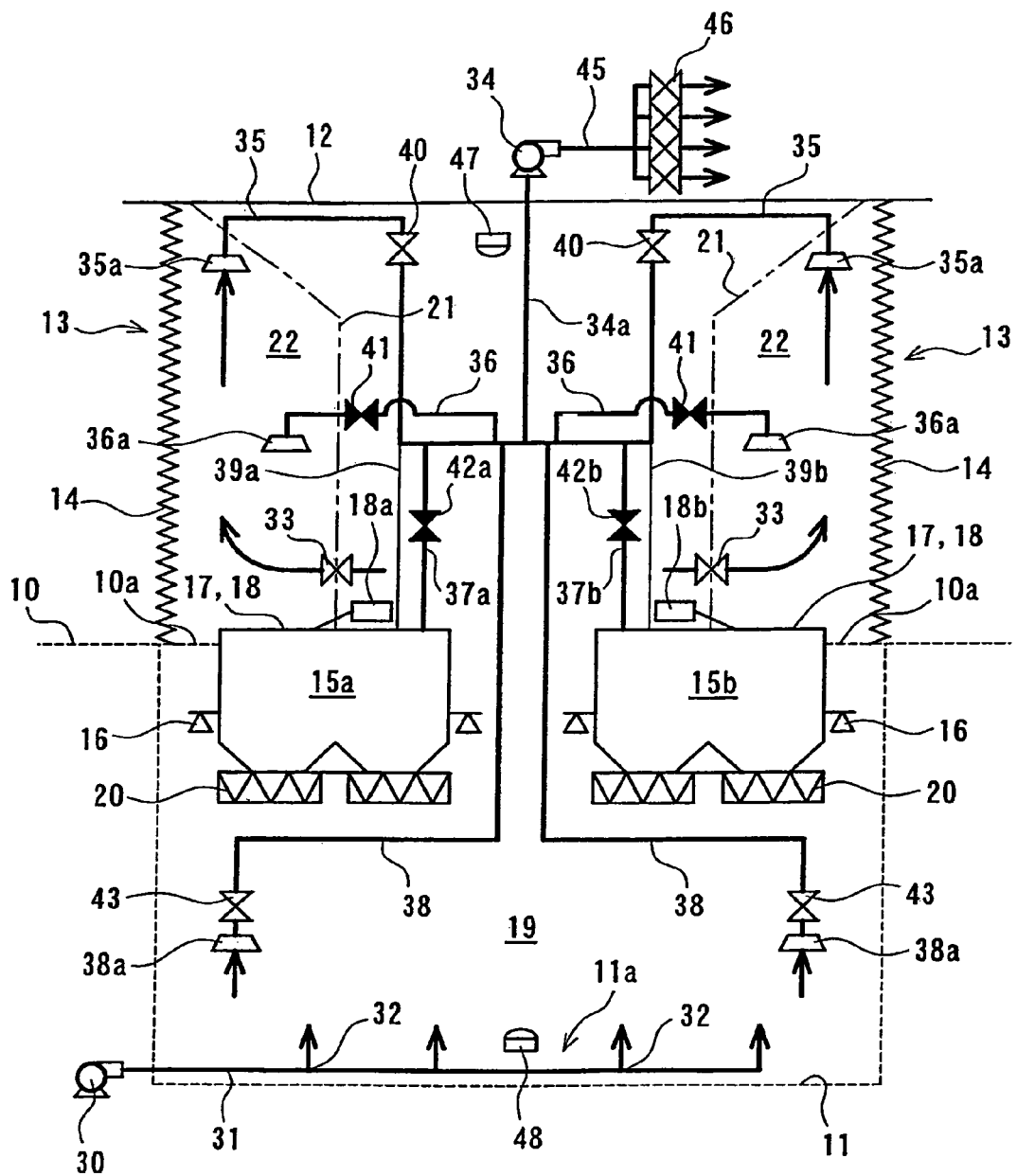
FIG. 1 is a schematic representation showing an embodiment of a ventilation system of a sludge receiving facility according to the present invention.

10 Running surface of transportation means
11 Underground pit (lower structure)
11*a* Bottom part
12 Building (upper structure)
13 Gate
14 Shutter (opening/closing means)
15*a*, 15*b* Sludge tank
17 Sludge charging port
18 Closing cover (closing means)
19 Inner space
21 Partition wall
22 Carrying-in space
30 Outside air blowing fan
32 Outer air blowing port
33 Opening/closing valve (air circulating means)
34 Ventilation fan
35*a*, 36*a*, 38*a* Suction port
35, 36, 37*a*, 37*b*, 38, 39*a*, 39*b* Exhausting line
40, 41, 42*a*, 42*b*, 43 Opening/closing valve
47 Methane gas detector
48 Hydrogen sulfide gas detector

DETAILED DESCRIPTION OF THE INVENTION

Figure 3:
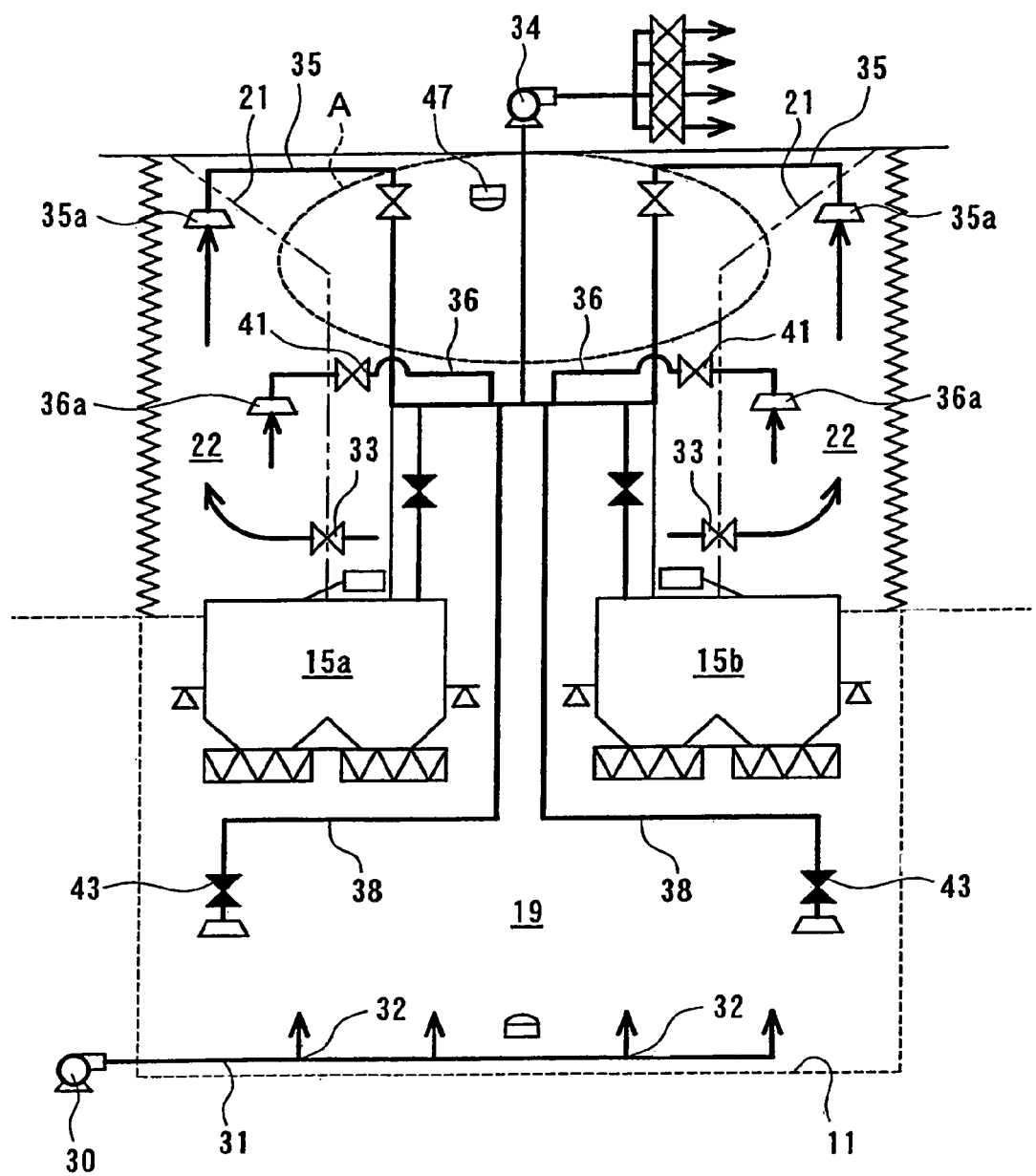
FIG. 3 is a schematic representation showing opened and closed states, and the like, of the opening/closing valves at the time when the concentration of methane gas is increased in FIG. 1.
Figure 4:
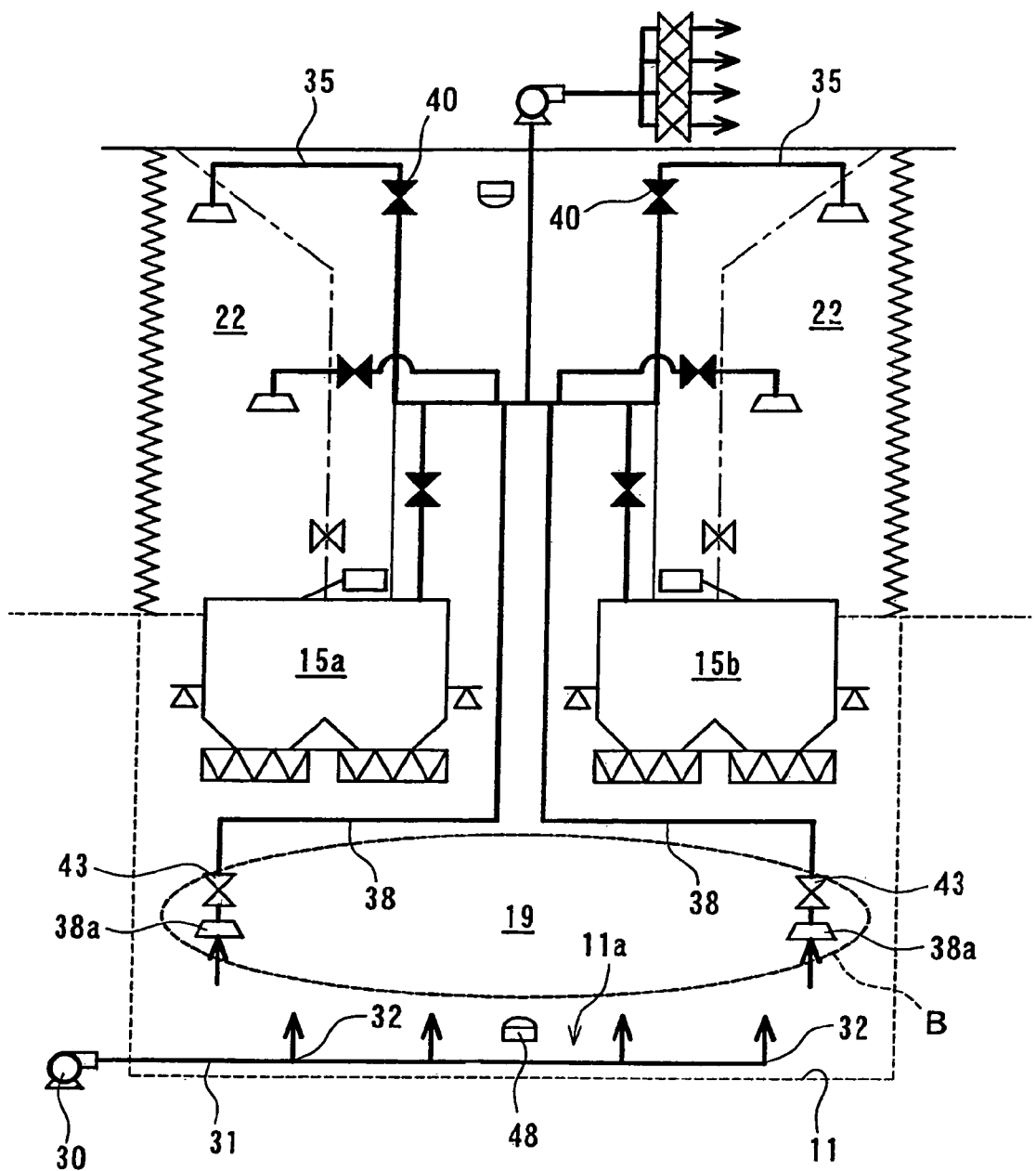
FIG. 4 is a schematic representation showing opened and closed states, and the like of, the opening/closing valves at the time when the concentration of hydrogen sulfide gas is increased in FIG. 1.
Figure 5:
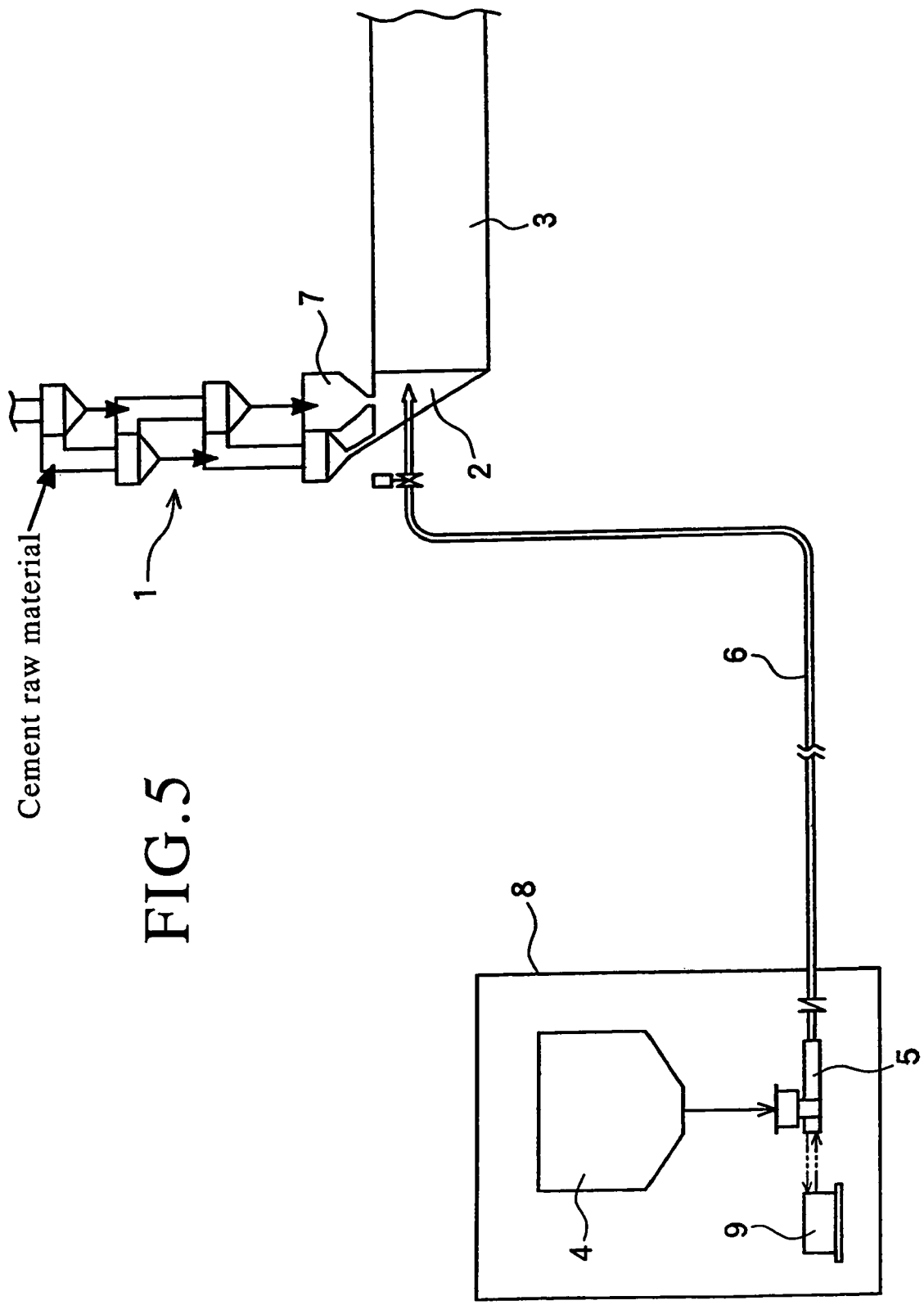
FIG. 5 is a schematic representation showing a sewage sludge disposal facility to which the ventilation system of the sludge receiving facility according to the present invention can be applied, and which is installed in combination with a cement clinker manufacturing facility.

FIG. 1 to FIG. 4 show a best embodiment in which a ventilation system of a sludge receiving facility according to the present invention is applied to a sludge receiving facility in a sewage sludge disposal facility installed in combination with a cement clinker manufacturing facility shown in FIG. 5.

First, there is described a configuration of the sludge receiving facility in which the above described ventilation system is installed. In the sludge receiving facility, an underground pit (lower structure) 11 is formed in a running surface 10 of a truck (transportation means) for transporting sludge, and a building 12 is constructed on the underground pit 11.

Also, gates 13 for enabling the truck to enter from the running surface 10 into the building are respectively formed in mutually facing wall surfaces of the building 12. In each of the gates 13, a shutter (opening/closing means) 14 for closing the inside of the building 12 during ordinary operation is provided in an openable and closable manner. Further, a running floor surface 10*a* connected to the running surface 10 is formed in the building 12 from each of the shutters 14.

On the other hand, two sludge tanks 15*a* and 15*b* are installed in the underground pit 11. The sludge tanks 15*a* and 15*b* are respectively mounted on load cells 16 which are respectively provided on support members in the underground pit 11 to measure the weight of the sludge tanks. The sludge tanks 15*a* and 15*b* are provided so as to allow the upper part thereof to be slightly projected from the running floor surface 10*a*.

Further, a sludge charging port 17, which is opened on the running floor surface 10*a*, is formed in each upper surface of the sludge tanks 15*a* and 15*b*, and a closing cover (closing means) 18 for closing the inside of the sludge tank during ordinary operation is provided in the sludge charging port 17. In this case, the closing covers 18, each of which is a hinge type door, are rotatably provided, so that the rear surface of the closing covers 18 is made to face the side of the respective gates 13 by cylinders 18*a* and 18*b* (see FIG. 2).

Thereby, an inner space 19 in which the underground pit 11 and the building 12 communicate with each other in the vertical direction through between the sludge tanks 15*a* and 15*b*, is formed in the inside of the underground pit 11 and the building 12. Also, inside the underground pit 11 of the inner space 19, there are provided apparatuses, such as put-out apparatuses 20 for sludge provided at the bottom of the sludge tanks 15*a* and 15*b*, and the pressure feed pumps 5 shown in FIG. 5 (not shown in FIG. 1 to FIG. 4).

Further, partition walls 21 are provided between the upper surface of the sludge tanks 15*a* and 15*b*, and the ceiling of the building 12. Thereby, sludge carrying-in spaces 22 are formed, each of which ranges from the gate 13 to the sludge charging port 17, and is air-tightly partitioned from the inner space 19 by the partition wall 21, the wall surface of the building 12, the shutter 14, the running floor surface 10*a*, and the upper surface of the sludge tank 15*a* or 15*b*.

Then, the present ventilation system is provided in the sludge receiving facility configured as described above. That is, in the bottom part 11*a* of the underground pit 11, there are arranged outside air blowing ports 32 (outside air blowing means) for continuously and forcibly feeding outside air into the inner space 19, which outside air is fed by an externally provided outside air blowing fan 30 through an air feed line 31.

Opening parts are respectively formed in the partition walls 21, and an opening/closing valve (air circulating means, opening/closing means) 33 which enables the inner space 19 to communicate with the carrying-in space 22 is attached to each of the opening parts. On the other hand, a ventilation fan 34 is installed outside the building 12, and a suction side main pipe 34*a* of the ventilation fan 34 is introduced into the building 12.

Then, the suction side main pipe 34*a* is connected to an exhausting line (first exhausting means) 35 for exhausting the air in the carrying-in space 22 from a suction port 35*a* arranged in the upper part of the each carrying-in space 22. The suction side main pipe 34*a* is also connected to an exhausting line (second exhausting means) 36 for exhausting the air above the sludge charging port 17 from a suction port 36a arranged at a position facing the sludge charging port 17 of the each carrying-in space 22.

Further, the suction side main pipe 34a is connected to exhausting lines (third exhausting means) 37a and 37b which are introduced into the sludge tanks 15a and 15b to exhaust the air inside the sludge tanks 15a and 15b. The suction side main pipe 34a is also connected to exhausting lines (fourth exhausting means) 38 which are introduced into the underground pit 11 to exhaust the air in the underground pit 11 from the suction ports 38a arranged in the underground pit 11. Further, the suction side main pipe 34a is connected to exhausting lines (fifth exhausting means) 39a and 39b which have a pipe diameter smaller than that of the exhausting lines 37a and 37b, to thereby always exhaust air in the respective sludge tanks 15a and 15b at a flow rate lower than that of the respective exhausting lines 37a and 37b.

Also, opening/closing valves 40, 41, 42a, 42b and 43 are inserted in the exhausting lines 35, 36, 37a, 37b and 38. The opening/closing control of the opening/closing valves 40, 41, 42a, 42b and 43 is performed by a control apparatus as will be described below.

Further, the air in the facility exhausted from the exhausting lines 35, 36, 37a, 37b, 38, 39a and 39b via the suction side main pipe 34a is fed to a plurality of cement clinker manufacturing apparatuses from opening/closing valves 46 via an air feed line 45 connected to the discharge side of the ventilation fan 34. The air fed to the respective cement clinker manufacturing apparatuses is introduced as combustion air into the preheater 1 shown in FIG. 5, or introduced into a cooler blowing fan (not shown) in the secondary air recovery zone of the clinker cooler of the dry process kiln 3, and is completely combusted to thereby be rendered harmless.

Further, in the ventilation system, a methane gas detector 47 is installed in the upper part of the inner space 19 of the building 12, and a hydrogen sulfide gas detector 48 is installed in the lower part of the underground pit 11. Further, there is provided a control apparatus which performs opening/closing control of the opening/closing valves 40, 41, 42a, 42b and 43 on the basis of detection signals from the detectors 47 and 48, opening/closing signals of the closing covers 18, and the like.

Subsequently, there will be described operation effects of the ventilation system of the sludge receiving facility configured as described above, along with control functions of the control apparatus, successively with reference to FIG. 1 to FIG. 4. Note that in the figures, a white opening/closing valve shows that the valve is opened, and a black opening/closing valve shows that the valve is closed.

First, in the ventilation system, the outside air blowing fan 30 is always operated, so that the outside air is continuously and forcibly fed into the inner space 19 from the outer air blowing port 32 installed in the bottom part 11a of the underground pit 11.

Also, during ordinary operation, as shown in FIG. 1, the opening/closing valve 33 provided in the partition wall 21, the opening/closing valve 40 of the exhausting line 35, and the opening/closing valve 43 of the exhausting line 38 are held opened. Thereby, a part of the outside air fed into the underground pit 11 is exhausted by the ventilation fan 34 from the suction port 38a in the underground pit 11 via the exhausting line 38. Further, the air which ascends in the inside of the inner space 19 is made to flow into the carrying-in space 22 via the opening/closing valve 33, and is exhausted by the ventilation fan 34 from the suction port 35a provided in the upper part of the carrying-in space 22 through the exhausting line 35. Further, the air in the sludge tanks 15a and 15b is always exhausted slowly through the exhausting lines 39a and 39b. As a result, it is possible to surely prevent malodor and the like, which is leaked from the sludge tanks 15a and 15b, from stagnating in the underground pit 11 and the building 12 of the sludge receiving facility.

Figure 2:
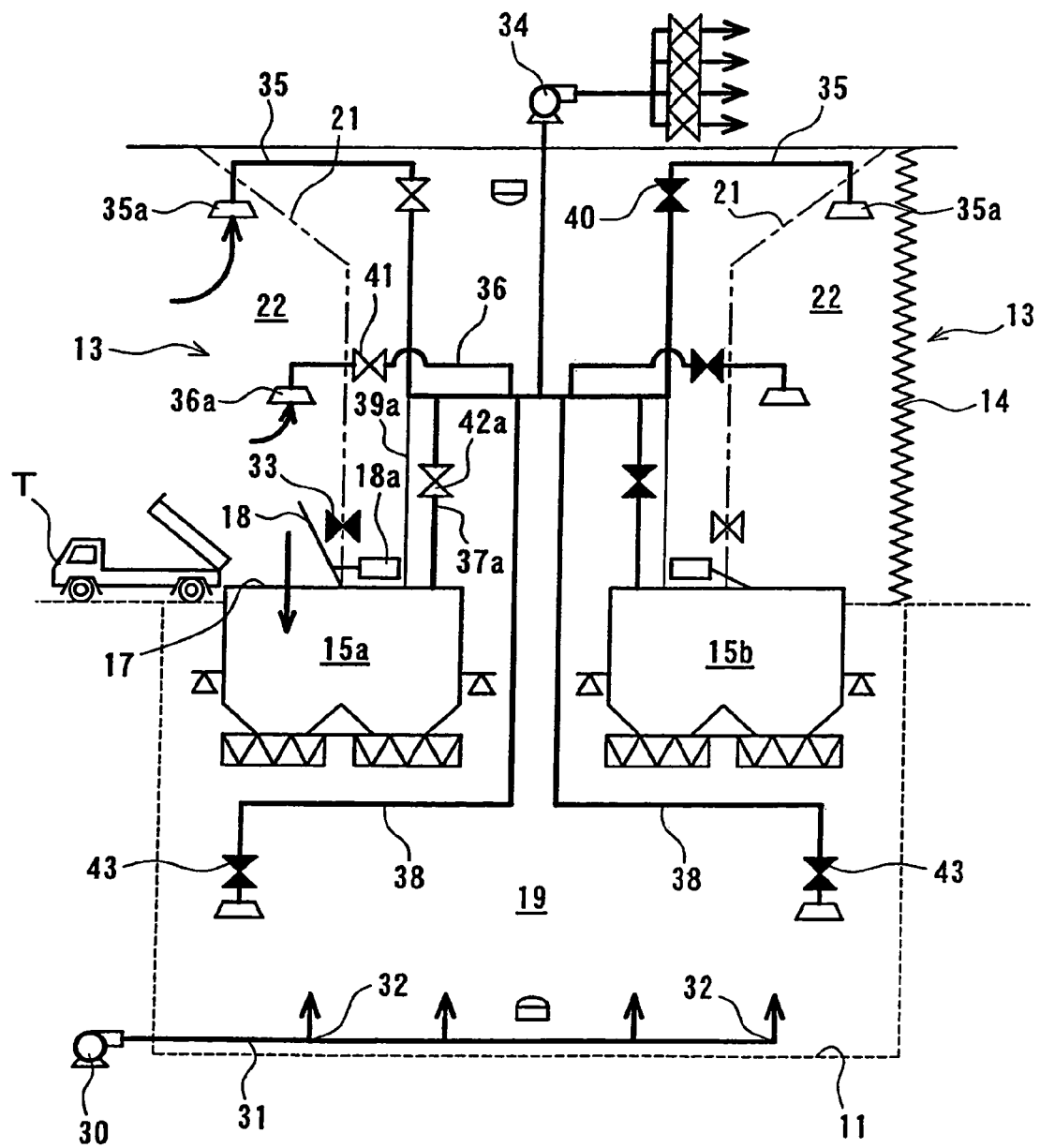
FIG. 2 is a schematic representation showing opened and closed state, and the like, of the opening/closing valves at the time of sludge reception in FIG. 1.

Further, as shown in FIG. 2, when sludge is received in the sludge tank 15a, the shutter 14 on the side of the sludge tank 15a is opened so as to allow the transportation truck (transportation means) T to enter the carrying-in space 22, and the closing cover 18 is opened by the cylinder 18a. At this time, the opening/closing valve 41 for the suction port 36a positioned above the opened sludge charging port 17 and the opening/closing valve 42a for the sludge tank 15a are opened on the basis of a signal from a limit switch by which the opening of the closing cover 18 is detected. Further, the opening/closing valve 33 of the carrying-in space 22, the opening/closing valve 43 of the underground pit 11, and the opening/closing valve 40 of the exhausting line 35 on the side of the other sludge tank 15b are closed.

Thereby, the suction force of the ventilation fan 34 is used mainly to exhaust the air in the sludge tank 15a via the exhausting line 37a, and to exhaust the air in the carrying-in space 22 via the exhausting lines 35 and 36.

In this way, by preferentially exhausting the air in the sludge tank 15a and the carrying-in space 22, in which malodor is generated in a large quantity by the charging of sludge, it is possible to prevent the malodor from flowing backwards to the inner space 19, or from being dispersed to the outside from the gate 13 which is opened to allow the entry of the truck T.

Further, as shown in FIG. 3, during ordinary operation, when methane gas is generated from the sludge in the sludge tanks 15a and 15b, and stagnates in the inner space 19 serving as the working space for the apparatuses, the concentration of methane gas in the upper part A as shown by a dotted line in the figure is increased. Then, when a value detected by the methane gas detector 47 provided in the upper part of the inner space 19 reaches a set value regarded as harmful, the opening/closing valve 43 of the exhausting line 38 from the underground pit 11 is closed by the control apparatus. In addition, the opening/closing valve 41 of the exhausting line 36 from the carrying-in space 22 is opened.

As a result, the whole amount of the outside air fed into the underground pit 11 is fed to the upper part of the inner space 19, and is made to flow, together with the methane gas, into the carrying-in space 22 from the opening/closing valve 33. In the carrying-in space 22, the air and the methane gas are powerfully sucked by the suction port 36a of the exhausting line 36 and the suction port 35a of the exhausting line 35, to thereby be early exhausted by the ventilation fan 34.

Then, when the methane gas concentration is lowered to a predetermined value or lower, the respective opening/closing valves are again set to the opened and closed states during ordinary operation as shown in FIG. 1 by the opening/closing control of the control apparatus.

On the other hand, as shown in FIG. 4, when hydrogen sulfide gas is generated from the sludge tanks 15a and 15b and stagnates in the inner space 19, the hydrogen sulfide gas stagnates in the bottom part B of the inner space 19 as shown by a dotted line in the figure, where the concentration of the hydrogen sulfide gas is increased. Then, when a value detected by the hydrogen sulfide gas detector 48 provided in the lower part of the underground pit 11 reaches a set value regarded as harmful, under the control of the control apparatus, the opening/closing valve 43 of the exhausting line 38 for exhausting the air in the underground pit 11 is held opened, and the opening/closing valve 40 for the exhausting line 35 is closed, which opening/closing valve is provided in the upper part of the carrying-in space 22 and is opened before the value detected by the hydrogen sulfide gas detector 48 reaches the set value.

As a result, the whole amount of the outside air fed into the underground pit 11 by the outside air blowing fan 30 is sucked from the suction port 38a together with the hydrogen sulfide gas stagnating in the underground pit 11, and is early exhausted from the exhausting line 38 by the ventilation fan 34. When the concentration of the hydrogen sulfide gas is lowered to a predetermined value or lower in this way, the respective opening/closing valves are similarly set again to the opened and closed states during ordinary operation as shown in FIG. 1 by the opening/closing control of the control apparatus.

As described above, according to the above described ventilation system of the sludge receiving facility, during ordinary operation, at the time of sludge reception, and further at the time when the concentration of methane gas and hydrogen sulfide gas is increased, the malodor generating place and the gas stagnating place are selectively and preferentially ventilated, while the air exhaustion in the other places are stopped. Thereby, even by the ventilation fan 34 of small capacity, it is possible to surely and efficiently prevent the malodor, gas or the like, from stagnating in the sludge tanks 15a and 15b, in the building 12 serving as the working space, and in the inner space 19 of the underground pit 11.

Further, even when the opening/closing valves 42a and 42b of the exhausting lines 37a and 37b are closed except at the time of sludge reception, it is possible to always exhaust the air in the sludge tanks 15a and 15b by the small diameter exhausting lines 39a and 39b provided in the sludge tanks 15a and 15b. As a result, the malodor concentration in the sludge tanks 15a and 15b can be prevented from increasing by small power of the ventilation fan 34.

Note that in the above described embodiment, there is described only the case where the ventilation system of the sludge receiving facility according to the present invention is applied to the sludge receiving facility in the sewage sludge disposal facility installed in combination with the cement clinker manufacturing facility, but the present invention is not limited to this. The ventilation system of the sludge receiving facility according to the present invention can be applied to sludge receiving facilities in various facilities, factories and the like.

INDUSTRIAL APPLICABILITY

According to the present invention, during ordinary operation, at the time of sludge reception, and the like, ventilation of a malodor generating place and a harmful gas stagnating place is selectively and preferentially performed, while the exhausting of the air in other places is stopped. Thereby, it is possible to efficiently prevent the malodor gas, and the like, from stagnating in a sludge tank, a structure covering the sludge tank, and the like, by ventilating means of small capacity.

The invention claimed is:

1. A ventilation system of a sludge receiving facility in which an upper structure and a lower structure are constructed, the upper and lower structures having respective inner spaces communicating with each other with a running surface of transportation means as a boundary, in which a gate having opening/closing means is provided in a wall of the upper structure, in which a sludge tank having a sludge charging port configured to be opened on the running surface and configured to be provided with closing means in an openable and closable manner is provided in the lower structure, and in which a partition wall is provided in the upper structure, the partition wall being configured to partition a carrying-in space from the inner space of the upper structure, the carrying-in space ranging from the gate to the sludge charging port, the ventilation system of the sludge receiving facility comprising:
    outside air blowing means configured to continuously and forcibly feed outside air to the inner space of the lower structure from a bottom part of the lower structure;
    air circulating means configured to enable the inner space of the upper structure and the carrying-in space to communicate with each other by moving air through the partition wall;
    first exhausting means configured to exhaust air in the carrying-in space from an upper part of the carrying-in space;
    second exhausting means provided in a position facing the sludge charging port of the carrying-in space and configured to exhaust air above the sludge charging port; and
    third exhausting means configured to exhaust air in the sludge tank, wherein opening/closing means are provided in each of the circulating means, the first exhausting means, the second exhausting means, and the third exhausting means.

2. The ventilation system of the sludge receiving facility according to claim 1, further comprising:
    a methane gas detector provided in an upper part of the inner space of the upper structure; and
    methane gas discharge control means configured to, when a detection value of the detector reaches a set value, open the opening/closing means of the circulating means and the first exhausting means at a time when the opening/closing means of the circulating means and the first exhausting means are not opened, and to close the opening/closing means of the third exhausting means at a time when the opening/closing means of the third exhausting means is not closed.

3. The ventilation system of the sludge receiving facility according to claim 1, further comprising:
    fourth exhausting means provided in the lower structure and configured to exhaust air in the inner space of the lower structure, the fourth exhausting means being provided with opening/closing means;
    a hydrogen sulfide gas detector provided in a lower part of the lower structure; and hydrogen sulfide gas discharge control means configured to, when a detection value of the detector reaches a predetermined value, open the opening/closing means of the fourth exhausting means at a time when the opening/closing means of the fourth exhausting means is not opened, and to close the opening/closing means of the first, second and third exhausting means when the opening/closing means of the first, second and third exhausting means are not closed.

4. The ventilation system of the sludge receiving facility according to claim 1, further comprising:
    fifth exhausting means configured to always exhaust air in the sludge tank at a flow rate lower than a flow rate of the third exhausting means.

5. The ventilation system of the sludge receiving facility according to claim 2, further comprising:
    fourth exhausting means provided in the lower structure and configured to exhaust air in the inner space of the lower structure, the fourth exhausting means being provided with opening/closing means;
    a hydrogen sulfide gas detector provided in a lower part of the lower structure; and hydrogen sulfide gas discharge control means configured to, when a detection value of the hydrogen sulfide gas detector reaches a predetermined value, open the opening/closing means of the fourth exhausting means at a time when the opening/closing means of the fourth exhausting means is not opened, and to close the opening/closing means of the first, second and third exhausting means when the opening/closing means of the first, second and third exhausting means are not closed.

6. The ventilation system of the sludge receiving facility according to claim 2, further comprising:
   fifth exhausting means configured to always exhaust air in the sludge tank at a flow rate lower than a flow rate of the third exhausting means.

7. The ventilation system of the sludge receiving facility according to claim 3, further comprising:
   fifth exhausting means configured to always exhaust air in the sludge tank at a flow rate lower than a flow rate of the third exhausting means.

8. The ventilation system of the sludge receiving facility according to claim 5, further comprising:
   fifth exhausting means configured to always exhaust air in the sludge tank at a flow rate lower than a flow rate of the third exhausting means.

* * * * *